No. 787,518. PATENTED APR. 18, 1905.
W. A. LAWRENCE.
CLEANING RUBBER.
APPLICATION FILED JULY 21, 1904.
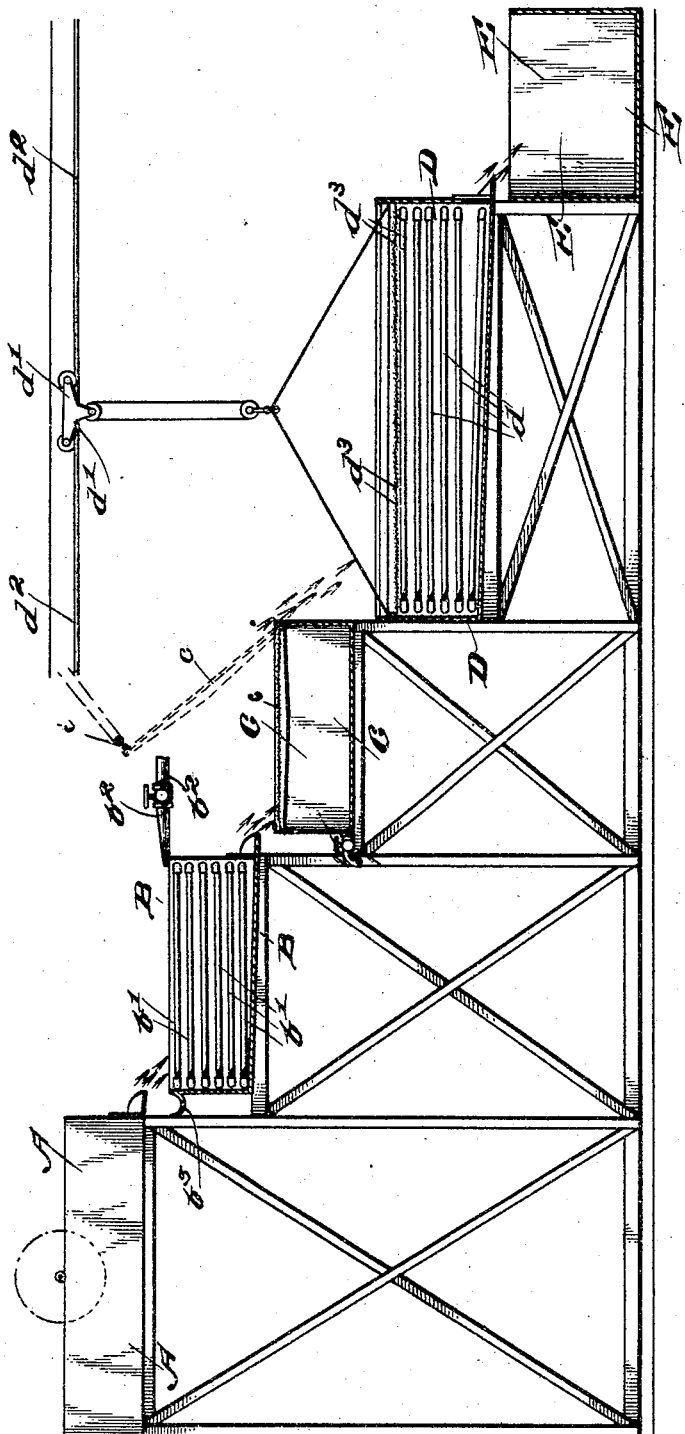
Witnesses
Inventor
WILLIAM A. LAWRENCE
By his Attorneys No. 787,518. Patented April 18, 1905.

UNITED STATES PATENT OFFICE.

WILLIAM A. LAWRENCE, OF NEW YORK, N. Y., ASSIGNOR TO CONTINENTAL RUBBER COMPANY, OF NEW YORK, N. Y., A CORPORATION OF NEW JERSEY.

CLEANING RUBBER.

SPECIFICATION forming part of Letters Patent No. 787,518, dated April 18, 1905.

Application filed July 21, 1904. Serial No. 217,557.

*To all whom it may concern:*

Be it known that I, WILLIAM A. LAWRENCE, a citizen of the United States, and a resident of the borough of Brooklyn, city and State of New York, have invented new and useful Improvements in Processes of Cleaning Rubber, of which the following is a specification.

This invention relates to a process of cleaning crude rubber by first grinding or macerating it and then subjecting it to liquids or solutions having different specific gravities. It has for its object the cleaning of crude rubber quicker, cheaper, and better than has heretofore been possible.

The process especially relates to the extraction of the fibrous and woody matter from the rubber.

All crude rubber as it comes to the manufacturer of rubber goods contains impurities, which must be removed, and moisture, which must be dried out, before the rubber can be used. The impurities, aside from water, frequently run as high as thirty per cent. and consists principally of woody fiber and bark along with some sand and mineral matter. The sand and mineral matter can easily be washed out, and I shall ignore them in describing my process. The fibrous material is so finely divided and so thoroughly incorporated in the rubber that its removal has always been expensive and tedious. The ordinary process for cleaning rubber consists in subjecting it to the action of corrugated rolls and at the same time washing it with water, the idea being that the rolls will by their action expose the fiber, which will be carried away by the water. This process is in the case of most varieties of crude rubber extremely slow and expensive.

My process is substantially as follows, reference being had to the accompanying drawing, which forms a part of this specification and which shows diagrammatically an apparatus suitable for use in carrying out my process: I take the crude rubber as it comes to the market and first soak it in water for a suitable period—say from three to twenty-four hours. The object of this soaking is to increase the density of the rubber, so that it will be substantially the same as that of water at normal temperature, (the temperature of the room where the process is carried out,) also to soften the rubber, so that it can be easily cut. I then cut it into pieces, preferably small. I mix these with about ten times their weight of water and feed the whole mixture into the beater A, which may be any approved type of beating-engine. The rubber after being subjected for a short time to the beater is run off into the tank B. It is then about the fineness of sawdust and is so thoroughly water-soaked that it remains suspended throughout the body of the water, which has the above-described normal temperature. The fibrous material, which it is my object to remove, is separate from the rubber. I have found that this fibrous material consists frequently of two parts, one being bark or cork and the other resembling wood-pulp. The latter settles toward the bottom of tank B, and the former floats on or near the surface of the water. The rubber, however, is suspended throughout the tank. I provide the tank B with steam-coils $b'$, and by raising the temperature of the water in this tank I so change its specific gravity that the suspended rubber will all settle toward or on the bottom and I can remove the floating impurities. This can be done in several ways, one of which is by means of a blast of air forced through the nozzle of $b^2$ onto the surface of the contents of the tank B. By this means the floating refuse is blown out of the tank into the trough $b^3$, which conducts it away. I next draw the water, rubber, and heavy refuse from the tank B onto the hinged screen $c$ of tank C. The water drains into tank C and can be carried away or used again. The hinged screen $c$ is swung backward by means of the pulley $c'$, and the rubber and heavy fiber is dumped into the tank D, which has been previously filled with water at a normal temperature. The fiber will sink and the rubber will remain suspended throughout the tank. I next add salt (sodium chlorid) to the contents of tank D and so increase the specific gravity of the water that the rubber will then rise to the surface and can be scooped up and carried away by suitable means, as by the swinging screen $d^3$. This screen is hung from a trolley $d'$, which travels on an overhead track $d^2$. The arrangement is such that the screen can be made to travel laterally, and thus pass under the suspended rubber, which it raises and carries away.

When by repeated separations of wood from rubber in tank D the wood accumulates to such an extent as to be an impediment, I filter the solution off into tank E. I may return this solution to tank B and use it again, or I may refill tank D with a fresh solution.

Tank D is provided with coils $d$, which may be connected with either a steam-boiler or with a refrigerating device, so that the temperature of the liquid in the tank can be regulated. It may be desirable to assist the action of the salt by cooling the water or to somewhat negative the action of the salt by heat.

It is obvious that the water-soaking, by which the weight of the rubber and impurities is increased, can be accomplished wholly or in part prior to the grinding of the rubber, during the grinding, or by allowing the finely-ground impure rubber to remain for a considerable length of time in the hot or salt water tanks.

I have mentioned salt as the substance by means of which I raise the specific gravity of the water in tank D because salt is neutral, is cheap, and gives a solution which easily penetrates the woody fiber and causes its specific gravity to increase. While salt is desirable for my purpose, I am aware that there are other substances which possess to a greater or less extent the properties of salt in this respect, and I do not wish to be limited to the latter substance.

While I have described my process as a process for cleaning rubber, there are other substances of similar nature—such as rubber scrap, gutta-percha, balata, and rubber-like gums—to which it will apply, and I wish to include them in the scope of this invention.

What I claim as my invention, and desire to secure by Letters Patent, is—

1. In a process for cleaning rubber, grinding the impure rubber, increasing the density of the rubber to substantially that of water, and at the same time increasing the density of the woody impurities to more than that of water, subjecting the rubber and impurities to heated water, thereby causing the rubber and woody impurities to settle, and removing from the surface of the water those impurities which float, substantially as described.

2. The process for cleaning rubber which consists in grinding the impure rubber in company with water, increasing the density of the rubber to substantially that of water, and at the same time increasing the density of the woody impurities to more than that of water, subjecting the ground impure rubber to a hot-water bath, thereby causing the rubber and woody impurities to settle in the same, removing the impurities which float, drawing off the rubber and woody impurities and subjecting the mass to a liquid having a density greater than that of the hot-water bath, and removing the rubber from the surface of said denser liquid, substantially as described.

3. In a process for cleaning rubber, the water soaking in salt water of finely-ground impure rubber for such a length of time that the woody impurities therein acquire a density greater than that of salt water, separating the woody impurities from the rubber by allowing them to settle away from the rubber and removing the rubber from the surface of said salt-water bath, substantially as described.

4. The process for cleaning rubber which consists in grinding the uncleansed rubber, immersing the mass in heated water, removing any impurities resting near the water-surface, then floating the remaining mass of rubber on the surface of salty water, and allowing the impurities to settle away from the rubber substantially as described.

5. In a process for cleaning rubber, grinding the uncleansed rubber, immersing the ground mass in heated water and subjecting the surface of the water to a blast of air, whereby the floating impurities are removed, substantially as described.

6. The process for cleaning rubber which consists in grinding the uncleansed rubber, subjecting said ground mass to a hot-water bath, removing the surface floating impurities from said hot-water bath, subjecting the remaining mass to a liquid having a density greater than that of the rubber and removing the rubber from the surface of said liquid, substantially as described.

7. The process for cleaning rubber, which consists in grinding the uncleansed rubber, immersing the mass in heated water, removing any impurities resting near the water-surface, then mixing the remaining mass with a liquid having a density greater than that of the rubber in said mass and allowing the impurities in the mass to settle from the rubber, substantially as described.

8. The process for cleaning rubber, which consists in subjecting ground rubber to a hot-water bath, permitting the rubber and the heavier impurities to settle, subjecting such settled mass to a liquid having a density greater than that of the rubber in said mass, and separating the rubber from the impurities while in said liquid, substantially as described.

9. The process for cleaning rubber, which consists in subjecting ground uncleansed rubber to a hot-water bath, permitting the rubber and the heavier impurities to settle, subjecting such settled mass to a salty liquid, and separating the rubber from the impurities while in the salty liquid, substantially as described.

In testimony whereof I have signed my name to this specification in the presence of two subscribing witnesses.

WILLIAM A. LAWRENCE.

Witnesses:
 JOHN W. PETERS,
 W. H. BERRIGAN.